United States Patent

Klausing

[15] 3,676,935

[45] July 18, 1972

[54] SETTING GAGE FOR MULTIPLE HEAD TOOL HOLDER

[72] Inventor: Melvin H. Klausing, Chattanooga, Tenn.

[73] Assignee: Combustion Engineering, Inc., Windsor, Conn.

[22] Filed: July 23, 1970

[21] Appl. No.: 57,467

[52] U.S. Cl. ............................ 33/185 R, 33/172 R, 33/201, 88/34

[51] Int. Cl. .................................................... B27g 23/00

[58] Field of Search ............... 33/180 R, 189, 172 R, 169 R, 33/1 M, 201, 405; 88/34

[56] References Cited

UNITED STATES PATENTS

| 3,050,862 | 8/1962 | Koch | 33/185 R |
| 3,452,442 | 7/1969 | Lothmann | 33/185 R |
| 2,850,807 | 9/1958 | Gasper | 33/185 R |
| 3,518,769 | 7/1970 | Bullard et al. | 33/185 R |
| 3,548,693 | 11/1967 | Romi | 88/34 R |

*Primary Examiner*—William D. Martin, Jr.
*Attorney*—Eldon H. Luther, Robert L. Olson, John F. Carney and Richard H. Berneike

[57] ABSTRACT

A setting gage for a multiple head tool holder wherein the cutting tools thereof are properly aligned to permit complete machining of tube ends in one operational step. A gage block is configured so as to have the shape of the desired finished tube ends; and its vertical location is controlled by a block actuating motor to position the gage block relative to the axis of the multiple head tool holder so that the block represents a tube with the radius of the tube desired to be operated upon. A numerical counter is interrelated with the vertical control motor so as to give an accurate visual indication of the gage block vertical position and thus the diameter of the tube to be operated upon.

5 Claims, 8 Drawing Figures

Patented July 18, 1972

INVENTOR
MELVIN H. KLAUSING

BY Lawrence P. Kessler
ATTORNEY

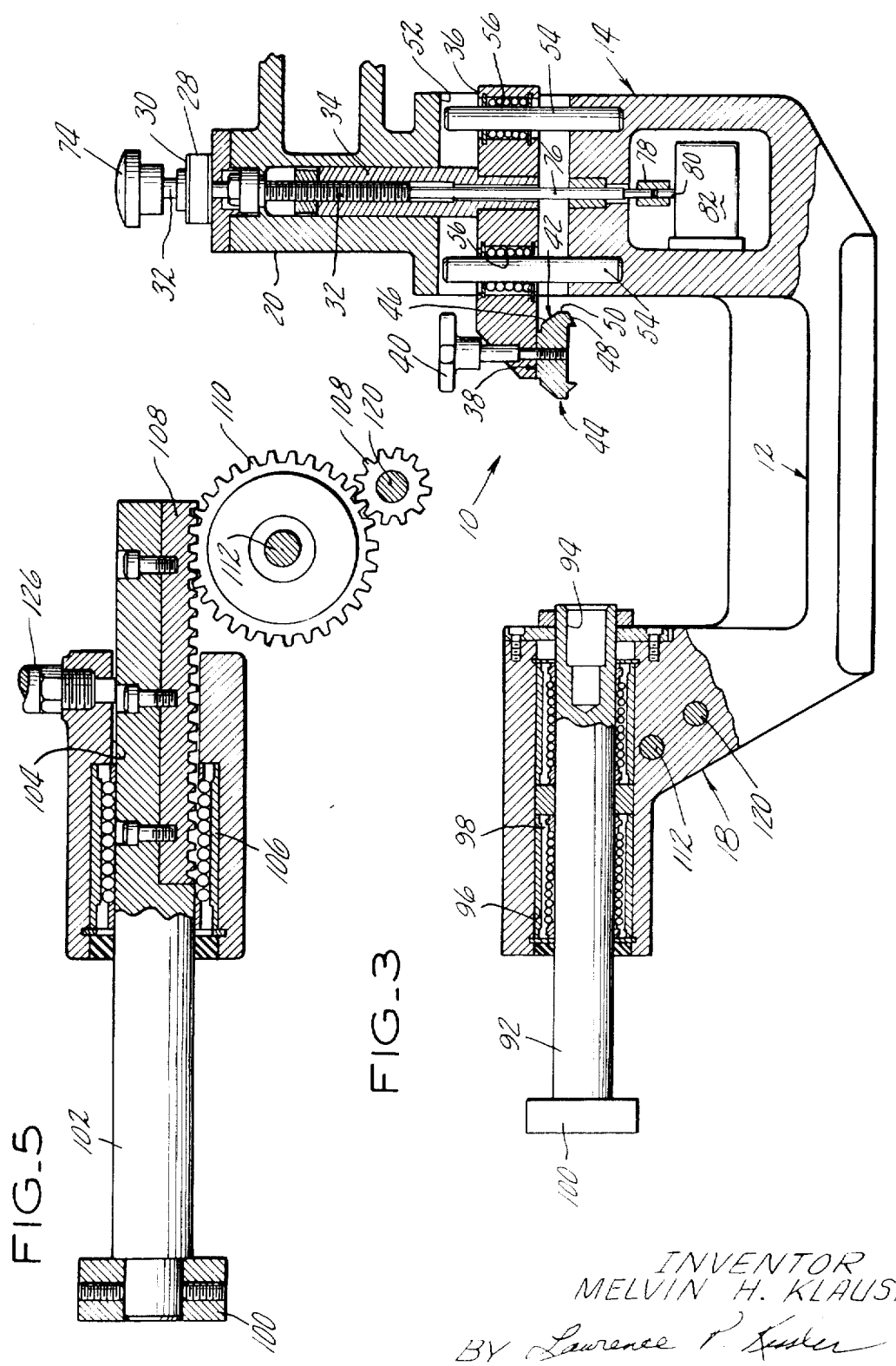

Patented July 18, 1972

INVENTOR
MELVIN H. KLAUSING
BY Lawrence P. Lewis
ATTORNEY

SETTING GAGE FOR MULTIPLE HEAD TOOL HOLDER

BACKGROUND OF THE INVENTION

In welding together sections of tubing, it is often necessary to prepare the ends of the tubing to ensure the formation of a proper mating interface for the joining thereof. Tube end preparation involves three fundamental operational steps: (1) Facing the end of the tubing, (2) chamfering the inside tube diameter, and (3) chamfering the outside tube diameter. For obvious economical considerations, it is desirable to accomplish the plural tube end preparation steps at the same time. Several devices have been designed which perform this function; however, due to the vast number of tube sizes and the different end configurations used in industry (and more particularly the steam generator fabrication industry), an extremely large number of different cutting tool arrangements are necessary. While some limitedly adjustable composite tools have been devised to perform the finishing of the various tube end configurations, the set up of these tools must be accomplished by tedious manual adjustments prior to operation on each group of different tube ends to be finished.

SUMMARY OF THE INVENTION

It is the purpose of this invention to provide an apparatus which will permit rapid and accurate adjustment of a device to perform simultaneous multiple machining operations on the vast number of tube sizes with various end configurations used in today's wide variety of industrial applications. The apparatus includes a gage block configured so as to have the shape of several desired finished tube ends; and its vertical location is controlled by a block actuating motor to position the gage block relative to the axis of the multiple head tool holder so that the block represents a tube with the radius of the tube desired to be operated upon. A numerical counter is interrelated with the vertical control motor so as to give an accurate visual indication of the gage vertical position and thus the diameter of the tube to be operated upon.

BRIEF DESCRIPTION OF THE DRAWINGS

FIG. 3 is a side elevational view partly in section of the tool setting gage of FIG. 1.

FIG. 5 is a side elevational view partly in section of the spindle shaft drive mechanism.

DESCRIPTION OF THE PREFERRED EMBODIMENT

Figure 1:
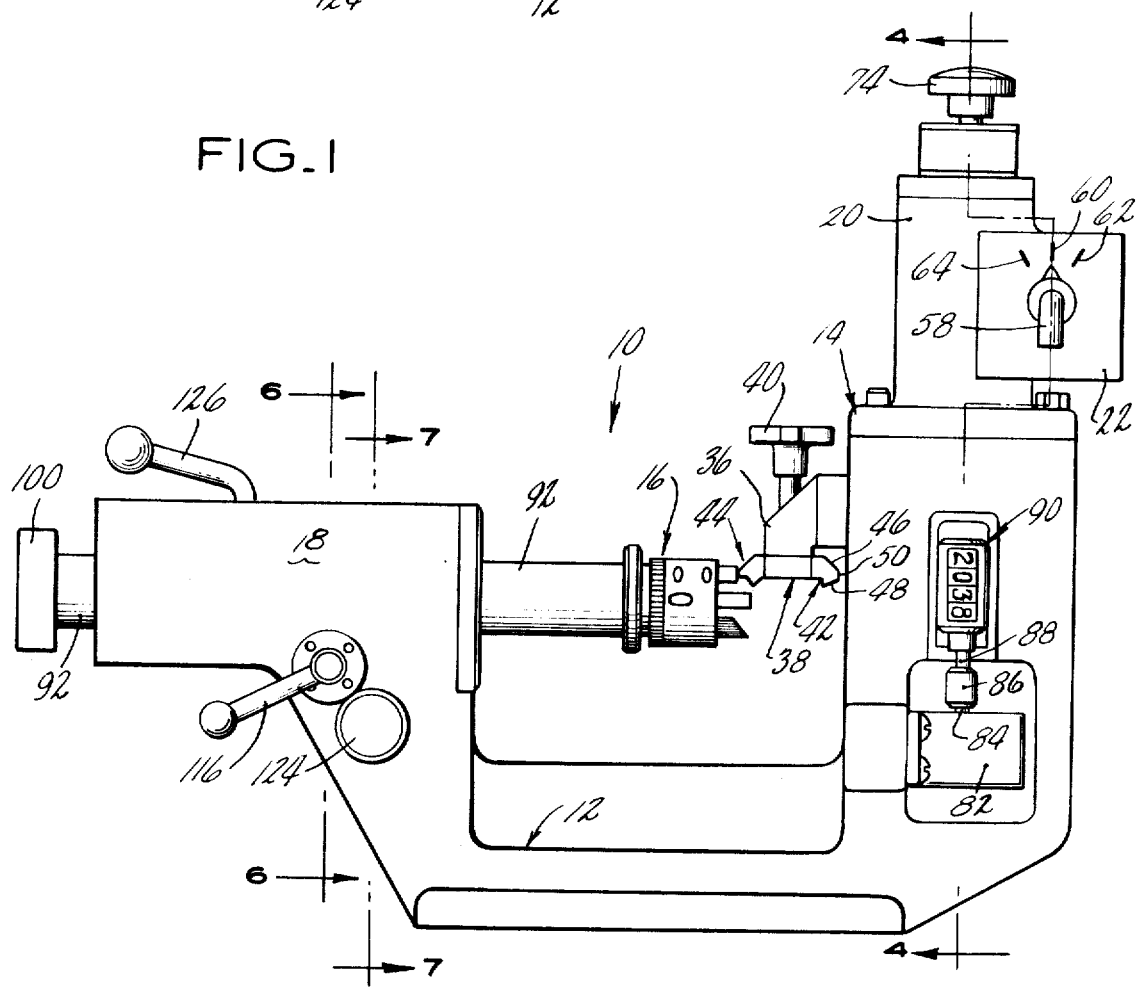
FIG. 1 is a side elevational view of the tool setting gage of this invention.

Referring now to the drawings, FIG. 1 shows the tool setting gage 10 according to this invention. The tool setting gage 10 has a U-shaped base 12 having an upstanding gage adjusting portion 14, supporting the multiple head tool holder 16, and an upstanding spindle drive portion 18.

The upstanding gage adjusting portion 14 comprises a housing 20 supporting a double acting motor 22. The motor 22 has a pulley 24 mounted on the drive shaft 26 thereof (see FIG. 4). A drive belt 28 engages the pulley 24 and is entrained about a second pulley 30 mounted for integral movement with the lead screw 32. The lead screw 32 is threadably engaged with a vertical adjusting arm shaft 34 (see FIG. 3) which is fixed to a vertical adjusting arm 36 and supported within housing 20 so as to permit only longitudinal movement. The gage block 38 is supported by a gage block clamp 40 extending through the vertical adjusting arm 36. The gage block 38 is constructed as a template to have oppositely directed contoured faces 42 and 44 configured to the shapes of desired finished tubing ends. The contoured surfaces comprise a first angle 46, a second angle 48 and a flat surface 50, these surfaces representing the cross-section of several standard tube end configurations. The gage block 38 is positionable so as to present either face 42 or 44 toward the upstanding spindle drive portion 18 depending upon the standard tube end desired.

The vertical adjusting arm 36 is vertically movable within the opening 52 in the upstanding gage adjusting portion 14 of the U-shaped base 12 by means of the action of the rotation of the lead screw 32 effecting longitudinal movement of the arm shaft 34. Guides 54 passing through ball bushings 56 in the arm 36 guide the movement of the arm 36 within the opening 52. Switch 58 serves to selectively activate the motor 22 to raise or lower the arm 36 with the resultant raising or lowering of the gage block 38. The face of the motor 22 has position markings 60, 62, and 64, respectively indicating a neutral position, a raising position and a lowering position. A switch bank 66 (see FIG. 4) is provided with electrical input leads 68 and electrical output leads 70 particularly connected ( in a manner not shown) thereto in order to accomplish transmission of the proper raising or lowering operational signal through the cable 72 to the motor 22. For fine adjustment by manual means, there is provided a hand knob 74 integrally associated with the lead screw 32.

Figure 4:
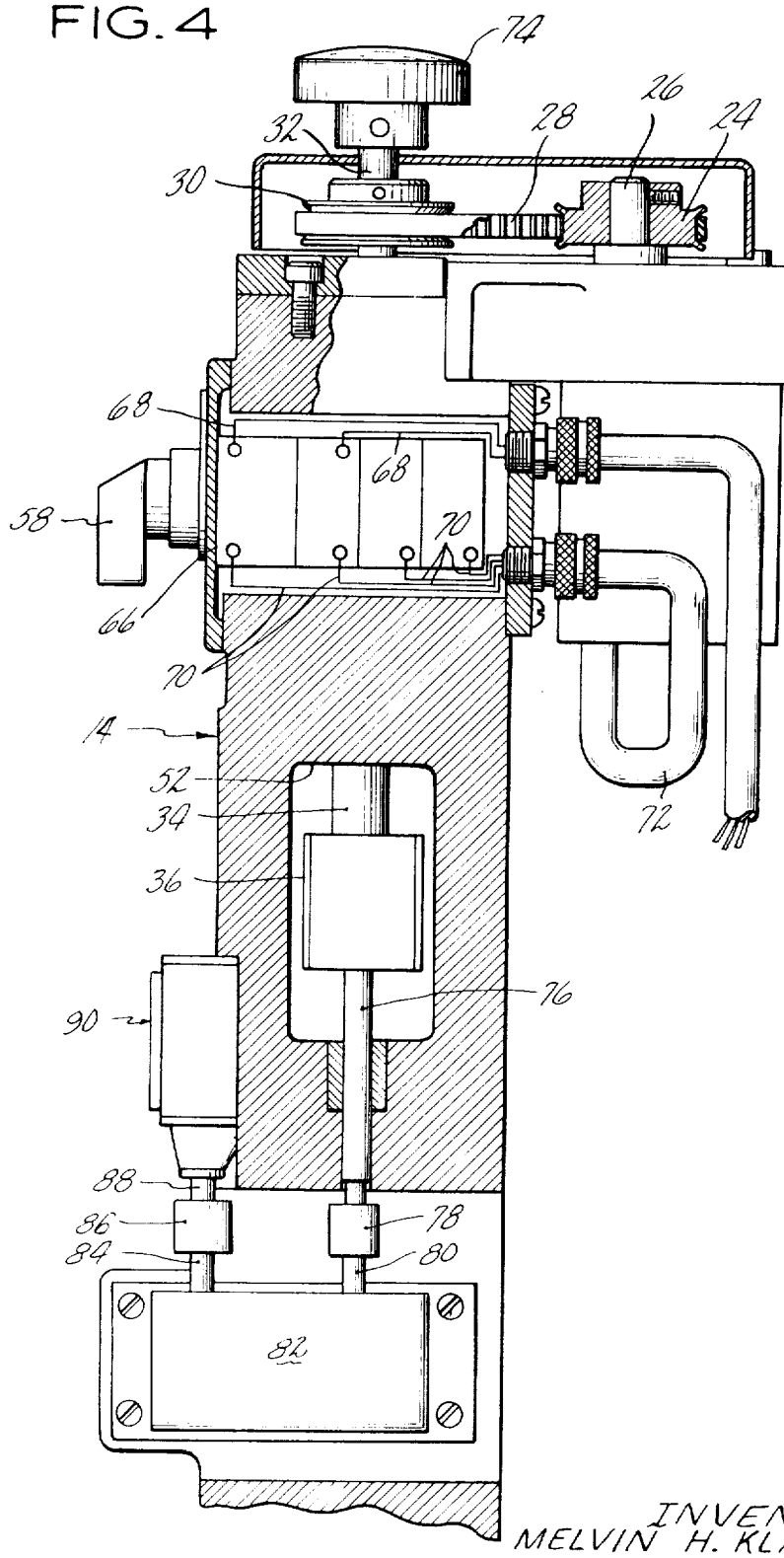
FIG. 4 is a sectional view of the tool setting gage taken along line 4—4 of FIG. 1.

The lead screw 32 has an extension 76 which is connected via a coupling 78 to the input shaft 80 of a gear box 82 (see FIGS. 3 and 4). The gear box 82 has an output shaft 84 which, via coupling 86, connects to the input shaft 88 of a visual counter assembly 90. In this manner, rotation of the lead screw 32 to vertically adjust arm 36 and gage block 38 also imparts an accurate proportional rotation to the shaft 88 of the visual counter assembly 90 to give a visual indication of the vertical position of the gage block 38. The visual indication is read out in terms of the diameter of the tube which the vertical position of the gage block 38 represents.

Figure 2:
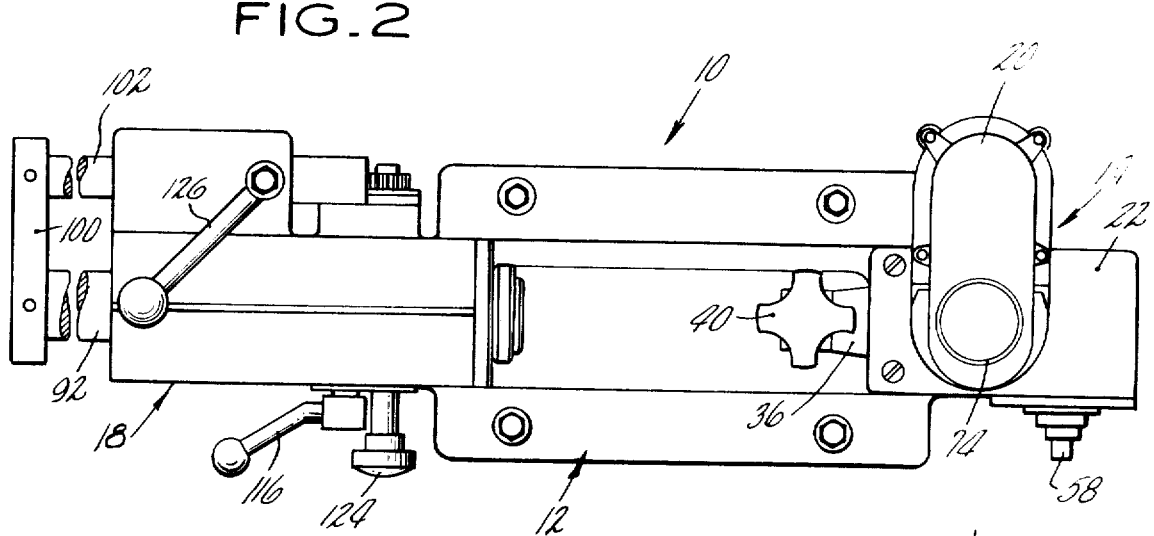
FIG. 2 is a plan view of the tool setting gage of FIG. 1.

The upstanding spindle drive portion 18 of the U-shaped base 12 carries a spindle shaft 92 having a tool retaining bore 94 in the forward end thereof. The spindle shaft 92 is reciprocable along its longitudinal axis in a bore 96 within the upstanding spindle drive portion 18 and is supported therein by ball bushing 98. A coupling plate 100 serves to couple the spindle shaft 92 to a drive shaft 102 (see FIG. 2). The drive shaft 102 reciprocates in a bore 104 in the upstanding spindle drive portion 18 and is supported therein by ball bushing 106 (see FIG. 3). Integrally connected with the drive shaft 102 is a rack 108 for the purpose of enabling the shaft 102 to be reciprocated.

Figure 7:
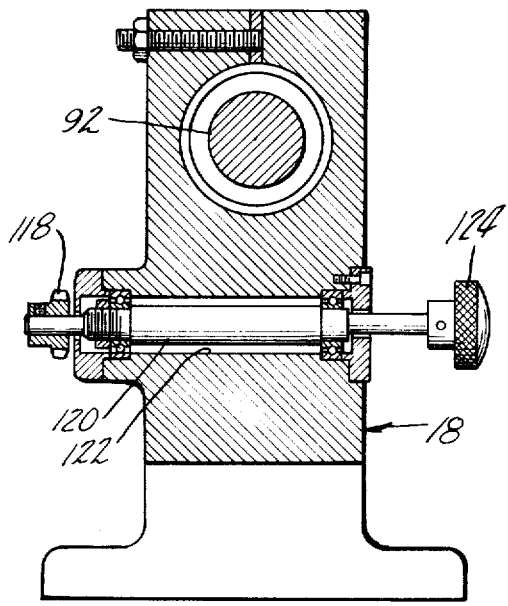
FIG. 7 is a sectional view of the fine adjusting mechanism taken on line 7—7 of FIG. 1.
Figure 6:
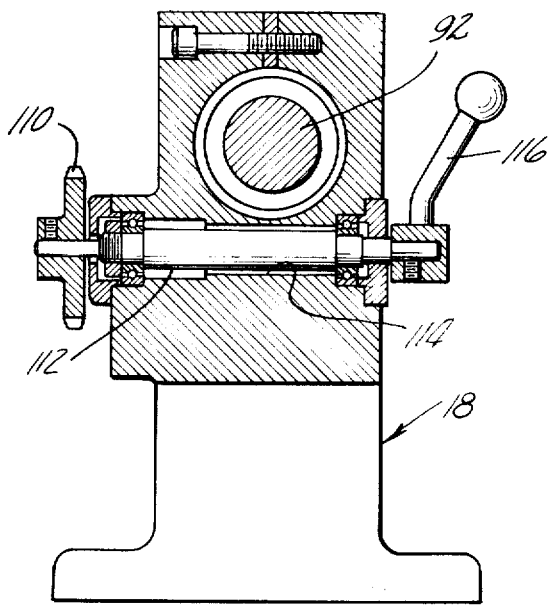
FIG. 6 is a sectional view of the quick-acting actuating mechanism taken on line 6—6 of FIG. 1.

In order to accomplish the reciprocation of the rack 108 (and thus the spindle shaft 92 as operably connected thereto through shaft 102 and coupling plate 100), a gear 110 is mounted on a shaft 112 which passes through a bore 114 in the spindle drive portion of the U-shaped base 12 (see FIG. 6). The opposite end of the shaft 112 has a handle 116 connected thereto for coarse rotational adjustment of the gear 110. Fine adjustment of the position of the rack 108 is accomplished by the provision of a gear 118, of smaller diameter than gear 110, mounted on a shaft 120 passing through a bore 122 in the upstanding spindle drive portion 18 of the U-shaped base 12 (see FIG. 7). A knob 124 on one end of the shaft 120 permits manual fine rotation of the smaller gear 118 with resultant fine adjustment of the rack 108. A friction locking handle 126 is provided in order to lock the drive shaft 102 in position after major and fine adjustments through handle 116 and knob 124 have been accomplished.

Figure 8:
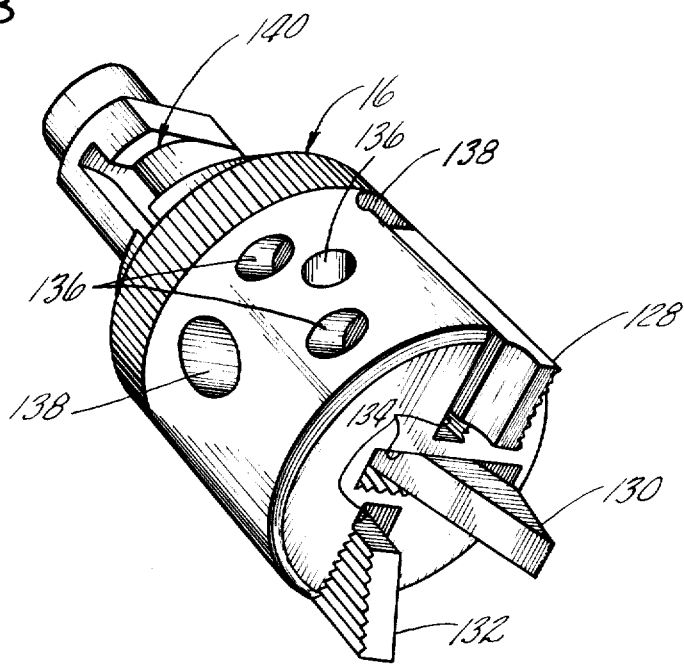
FIG. 8 is a perspective view of the multiple head tool holder.

FIG. 8 shows the details of a multiple head tool holder 16 ideally used in conjunction with the novel tool setting gage 10 of this invention. The multiple head tool holder 16 has an end facing tool 128, an inside chamfering tool 130 and an outside chamfering tool 132. These cutting tools are mounted in slots 134 in the face of the holder 16. Holes 136 are provided in the body of the holder 16 for set screws to lock the tools 128, 130 and 132 in their proper positions within the slots 134. Additionally, holes 138 are provided in the body of the holder 16 to facilitate removal of the cutting tools 128, 130 and 132. Extending rearwardly from the body of the multiple head tool holder 16 is a bayonet locking shaft 140 for locking within the jaws of a lathe or other apparatus used for driving the holder 16 in its actual tube end finishing operation.

The operation of the tool setting gage 10 described hereinabove is as follows. The diameter and configuration of the tube end to be finished are determined. The gage block 38 is then positioned to present the proper contour face 42 and 44 toward the spindle shaft 92 and is clamped in this position by the gage block clamp 40. The motor 22 is then actuated by turning the switch 58 to raise or lower the arm 36 (by action of motor 22 causing the rotation of the lead screw 32 and longitudinal movement of shaft 34). As noted, rotation of the lead screw 32 and its extension 76, through the action within the gear box 82, actuates the visual counter 90 to give an accurate reading of the vertical position of the gage block 38. This visual indication, as noted above, is representative of the diameter of the tube to be machined. For example, the figures shown in the visual indicator 90 (i.e., 2038) represent a tube diameter of 2.038 inches. Thus, by turning the knob 58 to its position 62 or position 64, and by manual fine adjustment through knob 74, the gage block 38 may be accurately positioned and at the same time an indication may be had of the diameter of the tube to be machined.

After the gage block 38 is properly positioned, with the spindle shaft 92 in its retracted position (FIG. 3), the multiple head tool holder 16 is inserted in the bore 94. The bayonet locking portion 140 of the tool holder 16 has only a friction fit within the bore 94 so as to permit hand rotation of the tool holder 16 within the bore 94. Gear 110 is then rotated by means of the handle 116 so as to reciprocate rack 108 and the spindle shaft 92 operatively associated therewith to position the multiple head tool holder 16 adjacent the gage block 38. The multiple head tool holder 16 is then rotated so that the end facing tool 128 is opposite the flat surface 50 of the gage block 38.

Fine adjustment of the position of the tool holder 16 is accomplished by rotation of smaller gear 118 by knob 124 to move rack 108 and the shaft 92 operatively associated therewith so that the end facing tool 128 is immediately adjacent the surface 50 of the gage block 38. The spindle shaft 92 is then locked in this position by turning the locking handle 126 to fix the location of the drive shaft 102 which is coupled to the shaft 92 through coupling 100 as noted above. The tool 128 is then positioned within its slot 134 to abut the surface 50 of the gage block 38, and is locked in this position by the appropriate set screw 136. The multiple head tool holder 16 is then manually rotated so that the inside chamfering tool 130 is positioned opposite the surface 48 of the gage block 38. The inside chamfering tool 130 is positioned within its slot 134 so that the cutting surface of the tool 130 abuts the surface 48 of the gage block 38. The proper set screw 136 therefor is then tightened to maintain the tool in its correct position. Multiple head tool holder 16 is then again manually rotated so that outside chamfering tool 132 is adjacent surface 46 of the gage block 38. In a like manner tool 132 is positioned to abut the surface 46 and is locked within the multiple head tool holder 16 by the appropriate set screw 136.

The drive shaft 102 may then be unlocked by rotation of the locking handle 126 so as to permit retraction of the spindle shaft 92 by handle 116. The multiple head tool holder 16 may then be removed from the spindle shaft 92 and is in its proper setting to permit machining of the desired tube ends. When a different tube end configuration is desired to be machined, the holder 16 is merely returned to the setting gage 10 and the procedure is readily repeated for the new desired tube configuration parameters.

From the foregoing it can be seen that there is hereinabove readily accomplished a mechanism for efficiently and accurately setting cutting tools within multiple head tool holders for finishing the ends of tubing. A gage block having the contour of the end of the desired tube to be finished is accurately positioned with respect to the multiple head tool holder so as to represent the diameter of the tube to be worked on. In conjunction with the setting of the gage block to the correct diameter, a visual readout is accomplished to permit the operator to readily ascertain that the correct dimetrical setting has been obtained. The cutting tools of the tool holder may then be easily and accurately positioned, using the gage as a guide, to the desired tube end configuration.

While this preferred embodiment of the invention has been shown and described, it will be understood that it is merely illustrative and that changes may be made without departing from the scope of the invention as claimed.

What is claimed is:

1. A setting gage for a tool holder having multiple cutting tool heads located therein, said setting gage comprising a gage means; a gage positioning means for positioning said gage means along an axis extending in a first direction; a spindle shaft for retaining and positioning the multiple head tool holder, the longitudinal axis of said spindle shaft extending in a second direction perpendicular to said first direction; a visual readout means interrelated with said gage positioning means so as to yield a visual indication of the position of said gage means relative to said spindle shaft axis, said visual indication being representative of the diameter of a tube of twice the distance between said gage means and said spindle shaft axis; and a spindle reciprocating means for controllably orienting said multiple head tool holder with respect to said axis extending in said first direction whereby said gage means acts as a guide to properly align the cutting tools of said multiple head tool holder.

2. The apparatus of claim 1 wherein said gage means comprises a template block having at least one face thereof shaped to the configuration of a standard finished tube end.

3. The apparatus of claim 1 wherein said spindle shaft includes a bore in one end thereof for retaining said tool holder while permitting forced relative movement therebetween, and said spindle reciprocating means comprises a first drive mechanism for course adjustment of said spindle shaft with respect to said axis extending in said first direction, a second drive mechanism for fine adjustment of said spindle shaft with respect to said axis extending in said first direction and a selective locking mechanism to lock the location of said spindle shaft when its desired location relative to said axis extending in said first direction is achieved.

4. A setting gage for a tool holder having multiple cutting tool heads located therein, said setting gage comprising:
   a housing, said housing having a base, a first portion upstanding from said base and a second portion upstanding from said base, said first upstanding portion being spaced from said second upstanding portion;
   an adjusting arm passing through said first upstanding portion and supported therein for limited vertical movement;
   a gage means comprising a template block having at least one face thereof shaped to the configuration of a standard finished tube end, said gage means connected to said adjusting arm for vertical movement therewith;
   a motor fixed to said first upstanding portion and operably associated with said adjusting arm for controlling the vertical movement thereof with respect to a fixed reference;
   a spindle shaft passing through said second upstanding portion opposite said adjusting arm, said spindle shaft supported within said second upstanding portion for reciprocation therethrough along its longitudinal axis, said axis forming said aforementioned fixed reference;
   a bore in the forward end of said spindle shaft adapted to releasably retain the multiple head tool holder;
   a means for reciprocating said spindle shaft along its longitudinal axis to selectively move the forward end thereof adjacent said gage means; and
   a visual readout means interrelated with said motor and said adjusting arm so as to yield a visual indication of the position of said gage means connected to said adjusting arm relative to said fixed reference.

5. The apparatus of claim 4 wherein said means for reciprocating said spindle shaft includes a first drive mechanism for coarse adjustment of said spindle shaft with respect to said gage means, a second drive mechanism for fine adjustment of said spindle shaft with respect to said gage means and a selective locking mechanism to lock the location of said spindle shaft when its desired location relative to said gage means is achieved.

* * * * *